Patented July 7, 1953

2,644,841

UNITED STATES PATENT OFFICE 2,644,841

OXIDATION PROCESS FOR PRODUCTION OF 2,6-NAPHTHALIC ACID

Georges E. Tabet, Wilmington, Del., assignor to E. I. du Pont de Nemours and Company, Wilmington, Del., a corporation of Delaware No Drawing. Application January 20, 1951, Serial No. 207,066

1 Claim. (Cl. 260—524)

This invention relates to a process for oxidizing 2-methyl-6-acetylnaphthalene to 2,6-naphthalic acid.

It has been known for many years that alkyl benzenes, when oxidized with air or nitric acid, are converted into the corresponding aromatic carboxylic acids (U. S. Patents 1,332,028, 1,576,999, 2,245,528, 2,276,774). However in the air oxidation of alkyl benzenes numerous other oxidation products, including alcohols and aldehydes, have also been obtained. With nitric acid as the oxidizing agent the products have been largely carboxylic acids, the chief by-products being the result of interfering nitration and oxidative degradation reactions.

Partial oxidation products (e. g. methyl naphthyl ketone) have been obtained heretofore by air oxidation of ethyl naphthalene (Ind. Eng. Chem. 25,1286–7 (1933), cf. also U. S. 2,507,527). However, no satisfactory method has been described for converting such ketones, particularly those having an alkyl substituent attached to the ring, to dicarboxylic acids. There has been a need for improved methods for preparing such dicarboxylic acids, especially 2,6-naphthalic acid, since they are of considerable practical utility as intermediates in the manufacture of polyester type resins; in fact, the polyesters derived therefrom have certain advantages, from the standpoint of heat resistance, over the polyterephthalates, which are employed commercially in linen-like textiles.

The present invention is directed to a process for preparing 2,6-naphthalic acid by nitric acid oxidation of 2-methyl-6-acetyl naphthalene.

It has been discovered in accordance with this invention that the nitric acid oxidation of 2-methyl-6-acetylnaphthalene can be directed to the formation of 2,6-naphthalic acid, and the formation of other products can be suppressed, by carrying out the oxidation at a temperature of about 175° to 250° C. If desired this maximum temperature can be approached in stages, but such stepwise control of temperature is not at all necessary. For a sufficiently rapid oxidation rate for all practical purposes it is not necessary to employ a temperature exceeding about 210° C.

Any suitable pressure sufficient to maintain a liquid phase reaction mixture may be employed.

The aqueous nitric acid which is employed in the practice of this invention should preferably be quite dilute to suppress nitration reactions. A suitable concentration is about 5 to 25%. An excess of nitric acid should be employed for best results, a suitable quantity being about 2 to 10 mols of $HNO_3$ per mol of 2-methyl-6-acetylnaphthalene. Too large an excess of nitric acid (20 mols $HNO_3$ per mol of 2-methyl-6-acetylnaphthalene) results in considerable oxidative degradation of the organic constituents of the reaction mixture.

The invention is illustrated further by means of the following examples.

*Example 1.*—A mixture consisting of 200 grams of 14% aqueous $HNO_3$ (0.03 mol) and 9.2 grams of 2-methyl-6-acetylnaphthalene (0.05 mol) was heated at 150° for 10 minutes after which the temperature was increased to 200° and maintained at that level for 5 minutes. The resulting mixture was filtered and thoroughly washed with water. The light tan mass was extracted with aqueous NaOH to remove the acidic materials from the neutral products. The alkaline extract was acidified and the precipitate filtered and dried (wt., 6.3 grams solids). This crude had a neutralization equivalent (N. E.) of 156. Extraction of this mixture with acetic acid removed the more soluble 2-me-6-naphthoic acid (4.1 grams, N. E. 178; theory, 186) leaving behind 2.2 grams of 2,6-naphthalic acid (N. E. 110; theory, 108). The conversion of 2-methyl-6-acetylnaphthalene to 2,6-naphthalic acid was 20% of the theoretical, and the yield based on 2-methyl-6-acetylnaphthalene not recovered was 65% of the theoretical.

*Example 2.*—Experiments were made under the conditions set forth in the following table. The results demonstrated that, in experiments in which the nitric acid concentration is kept low enough to avoid excessive nitration of the benzene ring, conversion of 2-methyl-6-acetylnaphthalene to 2,6-naphthalic acid requires a temperature in excess of about 175° C., while oxidation of the acetyl group takes place at temperatures as low as 150° to 175° C.

*Effect of reaction conditions on nitric acid oxidation of 2-methyl-6-acetyl-naphthalene*

TABLE

| Experiment No. | 2-Me-6-Acetyl Naph-thalene (grams) | $HNO_3$ (grams) | $H_2O$ (grams) | Mol Ratio, $HNO_3$/ketone | Temperature, °C. | Time (hr.) | Conversion to— | | Remarks |
|---|---|---|---|---|---|---|---|---|---|
| | | | | | | | Me-Naph-thoic, percent | 2,6-Naph-thalic, percent | |
| 1 | 9.2 | 25 | 125 | 6:1 | 150–151 | 1/60 | 100 | 0 | |
| 2 | 9.2 | 25 | 125 | 6:1 | 150–165 | 1/4 | 100 | 0 | |
| 3 | 9.2 | 25 | 125 | 6:1 | 175–177 | 1/2 | 100 | 0 | |
| 4 | 9.2 | 12.5 | 125 | 3:1 | 150–155 | 1/2 | 100 | 0 | |
| 5 | 9.2 | 12.5 | 125 | 3:1 | 150–152 | 1/60 | 100 | 0 | |
| 6 | 9.2 | 90 | 125 | 20:1 | 125–130 | 1/4 | | | Excessive nitration and formation of colored products. |
| 7 | 9.2 | 90 | 125 | 20:1 | 147–150 | 1/4 | | | Do. |
| 8 | 9.2 | 90 | 125 | 20:1 | 150–153 | 1/4 | | | Do. |
| 9 | 9.2 | 12.5 | 125 | 3:1 | 175–180 | 1/60 | 92 | 8 | |
| 10 | 9.2 | 12.5 | 125 | 3:1 | 175 | 1/2 | 87 | 13 | |
| 11 | 9.2 | 12.5 | 125 | 3:1 | 175–178 | 1/4 | 87 | 13 | |
| 12 | 9.2 | 12.5 | 125 | 3:1 | 200–202 | 1/60 | 73 | 27 | |
| 13 | 9.2 | 12.5 | 125 | 3:1 | 200 | 1/2 | 68 | 32 | |
| 14 | 9.2 | 12.5 | 125 | 3:1 | 200–205 | 1/4 | 66 | 34 | |
| 15 | 9.2 | 25 | 125 | 6:1 | 200–206 | 1/4 | 60 | 40 | |
| 16 | 9.2 | 25 | 125 | 6:1 | 198–201 | 1/4 | 60 | 40 | |
| 17 | 9.2 | 40.5 | 96 | 9:1 | 150–156 for 1/4 hr. followed by 199–201 for 1/4 hr. | | 60 | 40 | |

It is to be understood that the foregoing examples are illustrative only and that many embodiments of the invention will occur to those who are skilled in the art. Catalysts commonly employed in nitric acid oxidation may be used if desired. These include copper and its compounds, vanadates, etc.

The 2-methyl-6-acetylnaphthalene which is employed in the process of this invention is obtainable by reaction between acetyl chloride and 2-methylnaphthalene, in $Cl_2CHCHCl_2$ as solvent, with $BF_3$ as catalyst.

I claim:

A process for preparing 2,6-naphthalic acid by oxidation of 2-methyl-6-acetylnaphthalene which comprises heating in the liquid phase 2-methyl-6-acetylnaphthalene with aqueous nitric acid in which the weight ratio of $H_2O:HNO_3$ is from 2.37:1 to 10:1, at a temperature within the range of 199° C. to 206° C., the initial mol ratio of $HNO_3$:2-methyl-6-acetyl-naphthalene being from 3:1 to 9:1, continuing the said oxidation until the 2-methyl-6-acetylnaphthalene is converted exclusively to methyl naphthoic acid and 2,6-naphthalic acid, the said conversion of 2-methyl-6-acetylnaphthalene to 2,6-naphthalic acid being from 27% to 40% on a mol basis, during a reaction time of from 1 to 30 minutes, and thereafter separating 2,6-naphthalic acid from the resulting product.

GEORGES E. TABET.

References Cited in the file of this patent

UNITED STATES PATENTS

| Number | Name | Date |
|---|---|---|
| 1,488,730 | Beall et al. | Apr. 1, 1924 |

FOREIGN PATENTS

| Number | Country | Date |
|---|---|---|
| 216,091 | Germany | Nov. 22, 1909 |
| 301,079 | Germany | Oct. 8, 1917 |

OTHER REFERENCES

Rousset: Beilstein (Handbuch, 4th ed.), vol. 7, p. 402 (1925).

Meyer et al.: Beilstein (Handbuch, 4th ed., 2nd supp., vol. 9), p. 653 (1949).